US008548441B1

(12) United States Patent
Jones et al.

(10) Patent No.: US 8,548,441 B1
(45) Date of Patent: Oct. 1, 2013

(54) METHOD AND SYSTEM FOR USING A HANDS-FREE-AUDIO PROFILE TO LIMIT USE OF A WIRELESS COMMUNICATION DEVICE

(75) Inventors: Bryce A. Jones, Overland Park, KS (US); Michael P. McMullen, Leawood, KS (US); Rodney D. Nelson, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 554 days.

(21) Appl. No.: 12/559,235

(22) Filed: Sep. 14, 2009

(51) Int. Cl.
*H04L 12/58* (2006.01)
*H04M 1/00* (2006.01)
*H04W 4/12* (2009.01)

(52) U.S. Cl.
USPC .............. 455/414.1; 455/412.2; 455/569.1; 455/567

(58) Field of Classification Search
USPC .............. 455/187, 414, 426–428, 456–462
See application file for complete search history.

(56) References Cited

U.S. PATENT DOCUMENTS

| 7,181,229 B2 | 2/2007 | Singh et al. | |
| 2002/0123329 A1 | 9/2002 | Murray | |
| 2002/0128000 A1 | 9/2002 | do Nascimento, Jr. | |
| 2002/0193080 A1 | 12/2002 | Komsi et al. | |
| 2005/0227677 A1* | 10/2005 | Kallio | 455/456.1 |
| 2006/0052141 A1* | 3/2006 | Suzuki | 455/569.1 |
| 2007/0105548 A1* | 5/2007 | Mohan et al. | 455/462 |
| 2008/0085689 A1* | 4/2008 | Zellner | 455/187.1 |
| 2009/0215466 A1* | 8/2009 | Ahl et al. | 455/456.1 |
| 2011/0195699 A1* | 8/2011 | Tadayon et al. | 455/418 |

FOREIGN PATENT DOCUMENTS

GB 2 420 059 A 5/2006

OTHER PUBLICATIONS

BlueAnt VI Voice Control Bluetooth Headset, Jan. 4, 2009, downloaded from the World Wide Web at http://www.maximumcpu.net/archives/1415.
Salamone, Salvatore, Safer Texting and Calling While Driving, Oct. 23, 2007.
Best Buy, Link, Sync, and Pair—A generic guide to connecting your phone and Bluetooth headset, downloaded from WWW at http://www.bestbuy.com/site/olspage.jsp?guideID=109 9396123330&categoryRep=pcmcat1__o39200050011&type=page&id=cat12077 on Aug. 31, 2009.
Personal Area Network, Wikipedia, the free encyclopedia, downloaded from the World Wide Web at http://en.wikipedia.org/wiki/Wireless_PAN on Sep. 1, 2009.

(Continued)

*Primary Examiner* — Kashif Siddiqui (57) ABSTRACT

The described systems and methods allow for safer operation of a wireless communication device (WCD). The methods may be carried out at the WCD or at a wireless-communications network that interfaces to the WCD. A hands-free-audio (HFA) profile associated with the WCD may be set to enabled or disabled. A speed-condition of the WCD is determined and compared to a speed-threshold. If the speed-condition is greater than the speed-threshold and the HFA profile is enabled, then the WCD is operable to engage in wireless communications (e.g., voice calls or text messaging) via an HFA device associated with the WCD. If the speed-condition is greater than the speed-threshold and the HFA profile is set to disabled, then the WCD may prevent and/or postpone wireless communications from occurring. After the speed-condition is determined to be less than the speed-threshold, previously received communications (e.g., text messages) may be presented via the WCD.

22 Claims, 4 Drawing Sheets

(56) References Cited

OTHER PUBLICATIONS

Yadon, H, Tab 13 Wireless NC/NCI Codes, Version 2008.2, AT&T, Oct. 2008.
BlueTomorrow.com, Bluetooth Pairing, downloaded from the World Wide Web at http://www.bluetomorrow.com/content/section/180/284/ on Aug. 31, 2009.
webopedia.com, What is Enhanced Message Service?, downloaded from the World Wide Web at http://www.webopedia.com/TERM/E/Enhanced_Message_Service.html on Aug. 31, 2009.
Svensson, Peter, New Service to Stop Loose Lips from Crashing Cars, downloaded from the World Wide Web at http://abcnews.go.com/print?id=6025126 on Aug. 20, 2009.
National Communications System, Technical Information Bulletin 03-2, SMS over SS7, Dec. 2003.

\* cited by examiner

METHOD AND SYSTEM FOR USING A HANDS-FREE-AUDIO PROFILE TO LIMIT USE OF A WIRELESS COMMUNICATION DEVICE

BACKGROUND

It is well known that users of wireless communication devices (e.g., cellular phones) use their devices while operating a vehicle (e.g., an automobile, a tractor and semi-trailer, or a freight train). Some people may perceive that safer vehicle operation occurs when a vehicle operator is not using a wireless communication device as compared to when the vehicle operator is using a wireless communication device. These same people may also perceive that safer vehicle operation occurs when the vehicle operator uses a wireless communication device in a hands-free-audio mode as compared to when the vehicle operator uses the wireless communication device in a non-hands-free-audio mode. These perceptions may exist because use of a wireless communication device while operating the vehicle may distract the vehicle operator from focusing on vehicle operation. The operator distraction may arise because the vehicle operator is engaging in a conversation, reading a text message, entering a text message, or performing some other function of the wireless communication device.

In order to reduce distractions that are attributable to operating a vehicle and a wireless communication device at the same time, some cities and states in the United States have enacted laws that prohibit automobile operators from holding a cell phone and/or from sending text messages while operating an automobile. While these laws may deter some automobile operators within these cities and states from using their cell phones when operating an automobile, other automobile operators within these cities and states may continue to use their cell phones while operating an automobile. As a result, these other automobile operators may continue to be distracted by operating a vehicle and a wireless communication device at the same time.

OVERVIEW

This overview describes exemplary systems and methods for reducing distractions that are attributable to the use of a wireless communication device (WCD). One or more of the described systems and methods may prevent an incoming voice call from being answered by the WCD, and these or other described system and methods may postpone presentation of messages (e.g., text messages) that are directed (e.g., addressed) to the WCD. One benefit of implementing the described systems and methods is that fewer vehicle accidents may occur because of the reduced distractions attributable to the use of a WCD.

In one respect, an exemplary embodiment may take the form of a system comprising: (i) a data storage device containing computer-readable program instructions, and a hands-free-audio profile for a WCD, wherein the hands-free-audio profile can be set to an enabled state or to a disabled state, (ii) a processor that is operable to execute the computer-readable program instructions, and (iii) a communication interface that is operable to receive a message that indicates an incoming voice call is available for connecting to the WCD. The program instructions comprise first program instructions that are executable to determine whether a speed-condition of the WCD is greater than a threshold speed. The program instructions comprise second program instructions that are executable if the hands-free-audio profile is set to the disabled state and the speed-condition of the WCD is determined to be greater than the threshold speed. Execution of the second program instructions prevents the incoming voice call from being answered by the WCD. The program instructions comprise third program instructions that are executable if the hands-free-audio profile is set to the enabled state and the speed-condition of the WCD is determined to be greater than the threshold speed. Execution of the third program instructions allows the incoming voice call to be answered via a hands-free-audio mode of the WCD.

In another respect, an exemplary embodiment may be arranged in the form of a method comprising: (i) maintaining a hands-free-audio profile of a WCD, wherein the hands-free-audio profile can be set to an enabled state or to a disabled state, (ii) determining whether a speed-condition of the WCD is greater than a threshold speed, (iii) receiving a message that indicates an incoming voice call is available for connecting to the WCD, (iv) if the hands-free-audio profile is set to the disabled state and the speed-condition of the WCD is determined to be greater than the threshold speed, then preventing the incoming voice call from being answered at the WCD, and (v) if the hands-free-audio profile is set to the enabled state and the speed-condition of the WCD is determined to be greater than the threshold speed, then allowing the incoming voice call to be answered via a hands-free-audio mode of the WCD.

In yet another respect, an exemplary embodiment may take the form of a system comprising: (i) a data storage device containing computer-readable program instructions, and a hands-free-audio profile for a WCD, wherein the hands-free-audio profile can be set to an enabled state or to a disabled state, (ii) a processor that is operable to execute the computer-readable program instructions, and (iii) a communication interface that is operable to receive a message or message-waiting-indicator that is destined for the WCD. The program instructions comprise first program instructions that are executable to determine whether a speed-condition of the WCD is greater than a threshold speed. The program instructions comprise second program instructions that are executable if the hands-free-audio profile is set to the disabled state and the speed-condition of the WCD is determined to be greater than the threshold speed. Execution of the second program instructions causes presentation of the message or the message-waiting-indicator via the WCD to be postponed. The program instructions comprise third program instructions that are executable if the hands-free-audio profile is set to the enabled state and the speed-condition of the WCD is determined to be greater than the threshold speed. Execution of the third program instructions allows the message or message-waiting-indicator to be presented via a hands-free-audio mode of the WCD.

In still yet another respect, an exemplary embodiment may be arranged in the form of a method comprising: (i) maintaining a hands-free-audio profile of a WCD, wherein the hands-free-audio profile can be set to an enabled state or to a disabled state, (ii) determining whether a speed-condition of the WCD is greater than a threshold speed, (iii) receiving a message or a message-waiting-indicator destined for the WCD, (iv) if the hands-free-audio profile is set to the disabled state and the speed-condition of the WCD is determined to be greater than a threshold speed, postponing presentation of the message or the message-waiting-indicator via the WCD, and (v) if the hands-free-audio profile is set to the enabled state and the speed-condition of the WCD is determined to be greater than the threshold speed, allowing presentation of the message or the message-waiting-indicator via a hands-free-audio mode of the WCD.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Introduction

This description describes exemplary systems and methods for reducing distractions that are attributable to the use of a wireless communication device (WCD). The described systems and methods may prevent the WCD from answering an incoming voice call, and these or other described systems and methods may postpone presentation of messages (e.g., text messages) that are directed (e.g., addressed) to the WCD. The described systems and methods may also prevent a WCD from placing an outgoing voice call, creating a text message, and sending a text message. The described systems and methods may allow a WCD to listen to an incoming communication (e.g., a voice call, a text message converted to an audible message, or a voice mail message) while operating in a hands-free-audio (HFA) mode of the WCD.

One or more of the exemplary methods may include maintaining an HFA profile of a WCD. The HFA profile may be set to an enabled state in which the WCD is operable in an HFA mode to carry out communications. The HFA profile may be set to a disabled state in which the WCD is not operable in the HFA mode.

The exemplary methods may include determining whether a speed-condition of the WCD is greater than a threshold speed. A processor may execute computer-readable program instructions to determine the state of the HFA profile and whether the speed-condition is greater than the threshold speed. Based on these determinations, the processor can cause the WCD to carry out functions that may reduce distractions arising from the use of the WCD during operation of a vehicle. As an example, these functions may include preventing or postponing presentation, initiation, or creation of a wireless communication. For purposes of this description, a wireless communication may include, for example, a voice call, a text message (e.g., a short message service (SMS) message or an enhanced message service (EMS) message), a multimedia messaging service (MMS) message, an e-mail message, a voice mail message, or a message-waiting-indictor.

2. Exemplary Architecture

Figure 1:
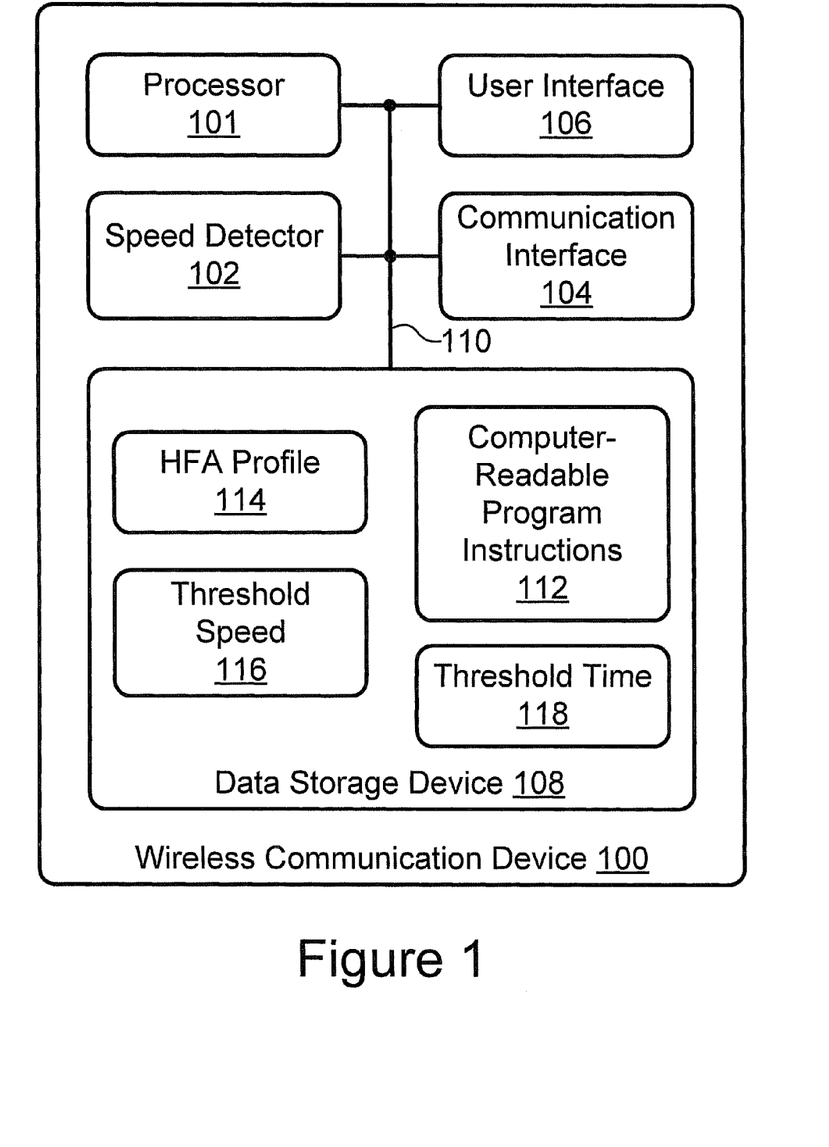
FIG. 1 is a block diagram of an exemplary wireless communication device.

FIG. 1 illustrates a wireless communication device (WCD) 100 in accordance with an exemplary embodiment. Those skilled in the art will appreciate that other arrangements and elements (e.g., machines, interfaces, functions, orders, and groupings of functions, etc.) can be used instead, and that some elements may be omitted altogether. Many of the elements described herein are functional entities that may be implemented as discrete or distributed components or in conjunction with other components, and in any suitable combination and location. Various functions described herein as being performed by one or more elements may be carried out by hardware, firmware, software (e.g., computer-readable program instructions that are stored at a data storage device and executable by a processor), or some combination of hardware, firmware, and software. For purposes of this description, the word "exemplary" is used to mean "serving as an example, instance, or illustration." Any embodiment or element described herein as "exemplary" is not necessarily to be construed as preferred or advantageous over other embodiments or elements.

As illustrated in FIG. 1, WCD 100 comprises a processor 101, a speed detector 102, a communication interface 104, a user interface 106, and a data storage device 108, all of which may be linked together via a system bus, network, or other connection mechanism 110. WCD 100 may be arranged as a mobile WCD such as a cellular phone, a personal digital assistant (PDA), or a pager. Other exemplary arrangements for WCD 100 are also possible.

Processor 101 may comprise one or more general purpose processors (e.g., INTEL microprocessors) or one or more special purpose processors (e.g., digital signal processors). Alternatively, processor 101 may comprise one or more general purpose processors and one or more special purpose processors. Processor 101 is operable to execute computer-readable program instructions, such as computer-readable program instructions 112 contained in data storage device 108. Execution of program instructions 112 can cause, processor 101, speed detector 102, communication interface 104, user interface 106, and data storage device 108 to carry out any of a variety of functions, such as those described in this description.

Speed detector 102 may be operable to determine a speed-condition of WCD 100 and/or to provide data for determining the speed-condition of WCD 100. Speed detector 102 may also be operable to provide the determined speed-condition or the data for determining the speed-condition to processor 101 and/or data storage device 108. The speed-condition of WCD 100 may comprise data that indicates a current and/or most recently determined speed of WCD 100. The speed-condition may be expressed in any of a variety of units such as kilometers per hour (km/hour), miles per hour (mph), or some other units. The speed-condition may also comprise data that indicates a time at which the current and/or most recently determined speed was determined. The speed-condition may also comprise data that indicates whether WCD 100 is moving at a speed that is greater than, less than, or equal to a threshold speed, such as a threshold speed 116. The speed-condition may also comprise data that indicates an amount of consecutive time that WCD 100 has been moving at a speed greater than, less than, or equal to the threshold speed, or an amount of consecutive time that WCD 100 has been stationary.

Speed detector 102 may comprise various devices for determining the speed-condition or the data for determining the speed-condition. For example, speed detector 102 may comprise an accelerometer, and/or a receiver that is operable to receive and process signals from a plurality of satellites. As an example, the receiver may comprise a global positioning system (GPS) receiver that is operable to receive signals from a plurality of satellites in orbit around the planet Earth. Additionally or alternatively, speed detector 102 may comprise program instructions that are executable by speed detector 102 or processor 101 to determine the speed-condition of WCD 100. As an example, these program instructions may be executable to determine the speed of WCD 100 based on (i) data that indicates a location of WCD 100 and an amount of time that WCD 100 has been at the location, or (ii) data that indicates the most recent locations of WCD 100 and the times at which WCD was at or is at each of the different locations.

Communication interface 104 may comprise one or more communication interfaces. For example, communication interface 104 may comprise (i) a communication interface that interfaces to an HFA device associated with WCD 100 (hereinafter the HFA device), and (ii) a communication interface that interfaces to a wireless-communications network (e.g., wireless-communications network 201, shown in FIG. 2). In particular, communication interface 104 may interface to a base transceiver station (BTS) (e.g., BTS 202) within network 201. As another example, communication interface 104 may comprise a single communication interface that interfaces to the HFA device and to the wireless-communications network.

As stated, communication interface 104 may interface to the HFA device. The HFA device may comprise a microphone, a speaker, and associated electronic circuitry. In one respect, the HFA device may interface with communication interface 104 via an air interface. In this regard, the HFA device (e.g., a wireless headset) may comprise a battery to power the device. The communications that occur via the air interface between communication interface 104 and the HFA device may be carried out in accordance with any of a variety of communication standards (e.g., protocols). As an example, the wireless communication standard may include a standard established by the Infrared Data Association (IrDA), a Bluetooth standard (e.g., Bluetooth 3.0, IEEE Standard 802.15.1-2002, or IEEE Standard 802.1.15-2005), an ultra-wide bandwidth (UWB) standard, a standard established by the Z-wave Alliance™, or some other standard.

In another respect, the HFA device may interface with communication interface 104 via a wired communication link that connects communication interface 104 to the HFA device. The communications that occur over the wired communication link may be carried out in accordance with any of a variety of standards. As an example, a standard for communicating over the wired communication link may include a standard established by the USB Implementers Forum (e.g., the universal serial bus (USB) specification 1.0, 2.0, or 3.0) or some other standard. In an embodiment in which the HFA device communicates via a wired connection, the HFA device may comprise a battery to power the device and/or the HFA device may receive electrical power from communication interface 104 via the wired connection.

User interface 106 may comprise various devices that are operable to present data to a user of WCD 100. As an example, user interface 106 may comprise one or more displays for presenting visual data, such as a text message, a still image, or a video. As another example, user interface 106 may comprise one or more speakers for presenting audible data, such as a ringtone that indicates an incoming voice call has been placed to WCD 100. User interface 106 may be used to present a wireless communication while WCD operates in a non-HFA mode.

User interface 106 may also comprise various devices that are operable to receive data entered by a user of WCD 100. As an example, user interface 106 may comprise a microphone and associated electronic circuitry that are operable in combination to detect audible data and to convert to the audible data into a form of data suitable for use by processor 101 and/or for storage at data storage device 108. As another example, user interface 106 may comprise a keypad and associated electronic circuitry operable in combination to detect data entered by pressing one or more keys on the keypad and to convert the entered data into a form suitable for use by processor 101 and/or for storage at data storage device 108. User interface 106 may be used to initiate and/or create a wireless communication while WCD operates in a non-HFA mode.

Data storage device 108 comprises a computer-readable storage medium readable by processor 101. The computer-readable storage medium may comprise volatile and/or non-volatile storage components, such as optical, magnetic, organic or other memory or disc storage, which can be integrated in whole or in part with processor 101.

Data storage 108 contains computer-readable data. As illustrated in FIG. 1, the computer-readable data contained within data storage device 108 comprises computer-readable program instructions 112, a hands-free-audio (HFA) profile 114, a threshold speed 116, and a threshold time 118. Data storage 108 may contain other computer-readable data as well.

HFA profile 114 comprises computer-readable data that indicates whether HFA functionality of WCD 100 is enabled or disabled. In this regard, HFA profile 114 may be set to an enabled state or to a disabled state. When HFA profile 114 is set to the enabled state, processor 101 may execute program instructions that cause WCD 100 to operate in an HFA mode. Operating in the HFA mode may include transmitting signals between communication interface 104 and the HFA device. When HFA profile 114 is set to the disabled state, WCD 100 will not operate in the HFA mode.

Figure 2:
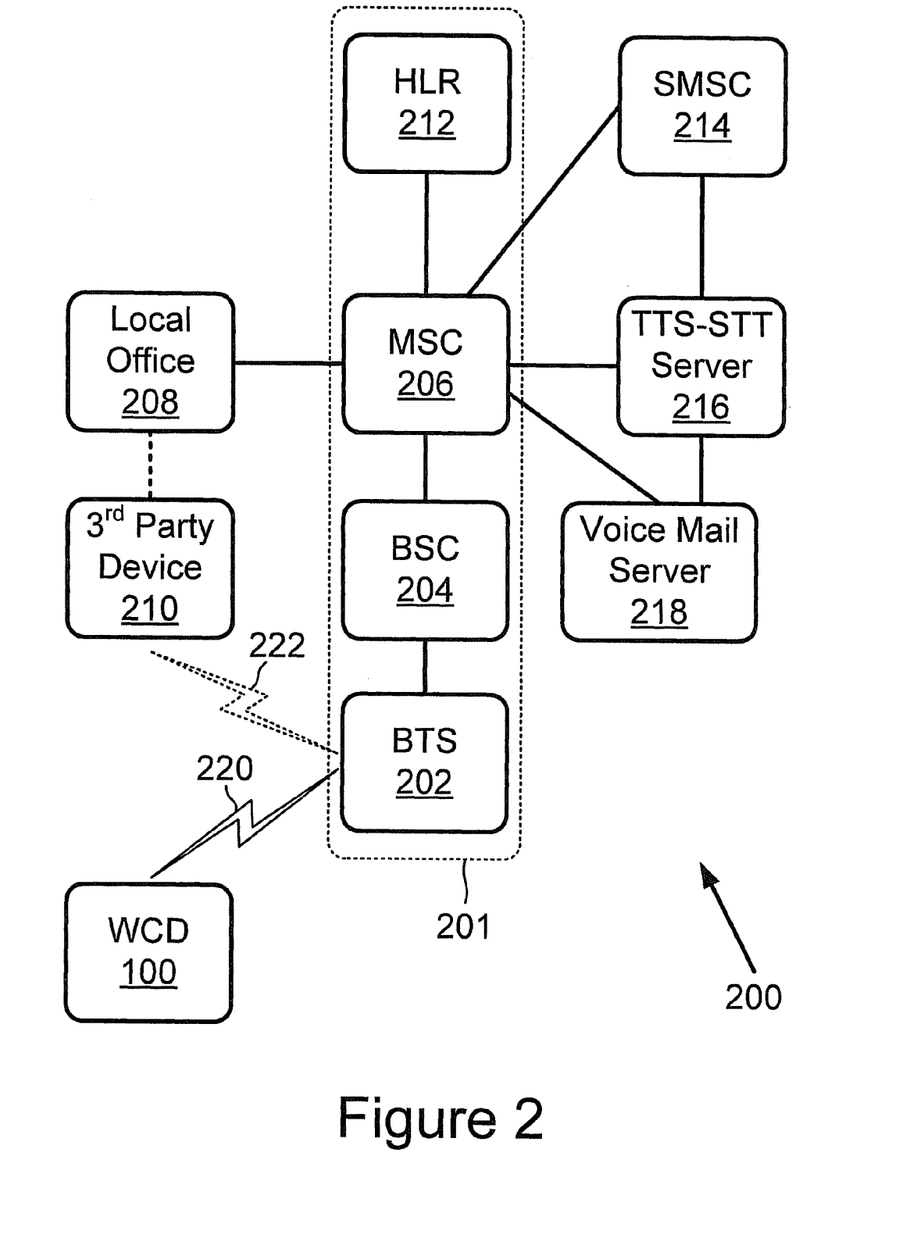
FIG. 2 is a block diagram of an exemplary system in which exemplary embodiments may be carried out.

HFA profile 114 may be switched from the enabled state to the disabled state or from the disabled state to the enabled state. In one respect, HFA profile 114 may be changed in response to user interface 106 receiving data that causes processor 101 to execute program instructions that cause HFA profile 114 to switch states. In another respect, HFA profile 114 may be changed in response to communication interface 104 receiving data from BTS 202, the received data causing processor 101 to execute the program instructions that cause HFA profile 114 to switch states. Additionally or alternatively, data similar to HFA profile 114 may be contained within a data storage device within wireless-communications network 201.

Threshold speed 116 comprises computer-readable data that indicates a given speed. The given speed may be a speed that is considered to be dangerous if WCD 100 is being used by an operator operating a vehicle at that speed. The given speed could be based on the age of a person that will be using WCD 100. For example, if WCD 100 will be used by a person that is 18 years old or younger, then the given speed may be 15 km/hour. As another example, if WCD 100 will be used by a person that is older than 18 years, then the given speed may be 30 km/hour. The given speed could be 0 km/hour. Additionally or alternatively, data similar to threshold speed 116 may be contained within a data storage device within wireless-communications network 201.

Threshold time 118 comprises computer-readable data that indicates a given amount of time. The given amount of time may be an amount of time used to indicate that WCD 100 is not in a moving vehicle. As an example, threshold time 118 may be based on the maximum amount of time it takes for a vehicle traffic signal to change from a red light (e.g., a stop signal) to a green light (e.g., a go signal). As an example, threshold time 118 may be 80 seconds. Other examples for basing the selection of the given time are also possible. Additionally or alternatively, data similar to threshold time 118 may be contained within a data storage device within wireless-communications network 201.

Computer-readable program instructions 112 may include a variety of program instructions that are executable by processor 101. As an example, program instructions 112 may include program instructions that are executable by processor 101 to determine the speed-condition of WCD 100. Execution of these program instructions may occur prior to, during, or after initiation of a wireless communication directed to WCD 100. Execution of these program instruction may also occur prior to, during, or after creation of a wireless communication at WCD 100.

As another example, program instructions 112 may include program instructions that are executable by processor 101 to determine whether the speed-condition of WCD 100 is greater than threshold speed 116, greater than or equal to threshold speed 116, equal to threshold speed 116, less than threshold speed 116, or less than or equal to threshold speed 116. Execution of these program instructions may occur prior to, during, or after initiation of a wireless communication directed to WCD 100. Execution of these program instruction may also occur prior to, during, or after creation of a wireless communication at WCD 100.

As another example, program instructions 112 may include program instruction that are executable by processor 101 to determine whether the speed-condition of WCD 100 has been less than threshold speed 116, less than or equal to threshold speed 116, or equal to threshold speed 116 for an amount of time that is greater than or equal to threshold time 118.

As another example, program instructions 112 may include program instructions that are executable by processor 101 to prevent an incoming voice call from being answered by WCD 100. Execution of these program instructions may occur while the voice call is available for answering, and if HFA profile 114 is set to the disabled state, and the speed-condition of WCD 100 is determined to be greater than threshold speed 116. Execution of these program instructions may cause communication interface 104 to transmit a page response message that indicates the incoming call should be not be connected (e.g., ignored) or that the incoming call should be transferred to a voice mail server 218.

As another example, program instructions 112 may include program instructions executable by processor 101 to allow an incoming voice call to be answered via an HFA mode of WCD 100. Execution of these program instructions may occur while the voice call is available for answering, and if HFA profile 114 is set to the enabled state, and the speed-condition of WCD 100 is determined to be greater than threshold speed 116. Execution of these program instructions may cause communication interface 104 to transmit, to the HFA device, a signal that indicates the incoming voice call is available for answering, and audio signals of the voice call after the voice call has been answered by the HFA device.

As another example, program instructions 112 may include program instructions executable by processor 101 to allow the incoming voice call to be answered via a non-HFA mode of WCD 100 but not via the HFA mode of WCD 100. Execution of these program instructions may occur while the voice call is available for answering, and if HFA profile 114 is set to the disabled state, and the speed-condition of WCD 100 is determined to be less than threshold speed 116. Execution of these program instructions may be conditioned on processor 101 determining that the speed-condition is less than threshold speed 116 for a time that equals or exceeds threshold time 118.

As another example, program instructions 112 may include program instructions executable by processor 101 to allow an incoming voice call to be answered via the HFA mode of WCD 100 or the non-HFA mode of WCD 100. Execution of these program instructions may occur while the voice call is available for answering, and if HFA profile 114 is set to the enabled state, and the speed-condition of WCD 100 is determined to be less than threshold speed 116. Execution of these program instructions may be conditioned on processor 101 determining that the speed-condition is less than threshold speed 116 for a time that equals or exceeds threshold time 118.

As another example, program instructions 112 may include program instructions executable by processor 101 to postpone presentation of a message or message-waiting-indicator via WCD 100. Execution of these program instructions may occur after transmission of the message or message-waiting-indicator to WCD 100, and if HFA profile 114 is set to the disabled state and the speed-condition of WCD 100 is determined to be greater than threshold speed 116. Postponing presentation of message or message-waiting-indicator may include postponing presentation of the message or message-waiting-indicator via the HFA device or user interface 106.

As another example, program instructions 112 may include program instructions executable by processor 101 to postpone presentation of a message or message-waiting-indicator via an HFA mode of WCD 100 but to allow presentation of the message or message-waiting-indicator via a non-HFA mode of WCD 100 (e.g., via user interface 106). Execution of these program instructions may occur after transmission of the message or message-waiting-indicator to WCD 100, and if HFA profile 114 is set to the disabled state and the speed-condition of WCD 100 is determined to be less than threshold speed 116. Execution of these program instructions may be conditioned on processor 101 determining that the speed-condition is less than threshold speed 116 for a time that equals or exceeds threshold time 118.

As another example, program instructions 112 may include program instructions executable by processor 101 to allow a message or message-waiting-indicator to be presented via an HFA mode of WCD 100. Execution of these program instructions may occur in response to WCD 100 receiving the message or message-waiting-indicator, and if HFA profile 114 is set to the enabled state and the speed-condition of WCD 100 is determined to be greater than threshold speed 116. For an embodiment in which the message or message-waiting indicator comprises a text message, execution of these program instructions may include converting the text message to an audible message, and causing communication interface 104 to transmit the audible message to the HFA device so as to allow presentation of the audible message via the HFA device.

As another example, program instructions 112 may include program instructions executable by processor 101 to allow a message or message-waiting-indicator to be presented via an HFA mode of WCD 100 and/or via a non-HFA mode of WCD 100. Execution of these program instructions may occur in response to WCD 100 receiving the message or message-waiting-indicator, and if HFA profile 114 is set to the enabled state and the speed-condition of WCD 100 is determined to be less than threshold speed 116. Execution of these program instructions may be conditioned on processor 101 determining that the speed-condition is less than threshold speed 116 for a time that equals or exceeds threshold time 118.

As another example, program instructions 112 may include program instructions that are executable by processor 101 to prevent WCD 100 from initiating a voice call and to prevent WCD 100 from creating or sending a wireless communication, such as a text message. Execution of these program instructions may occur when HFA profile 114 is set to the disabled state and the speed-condition of WCD 100 is determined to be greater than threshold speed 116.

As another example, program instructions 112 may include program instructions that are executable by processor 101 to prevent WCD 100 from initiating a voice call via an HFA mode of WCD 100 and to prevent WCD 100 from creating or sending a wireless communication, such as a text message, via the HFA mode of WCD 100, and to allow WCD 100 to initiate a voice call, create a wireless communication, and send a wireless communication via user interface 106 in a non-HFA mode. Execution of these program instructions may occur when HFA profile 114 is set to the disabled state and the speed-condition of WCD 100 is determined to be less than threshold speed 116. Execution of these program instructions may be conditioned on processor 101 determining that the speed-condition is less than threshold speed 116 for a time that equals or exceeds threshold time 118.

As another example, program instructions 112 may include program instructions that are executable by processor 101 to prevent WCD 100 from initiating a voice call via a non-HFA mode of WCD 100 and to prevent WCD 100 from creating or sending a wireless communication, such as a text message, via the non-HFA mode, and to allow WCD 100 to initiate a voice call, create a wireless communication, and send a wireless communication via HFA device in a HFA mode of WCD 100. Execution of these program instructions may occur when HFA profile 114 is set to the enabled state and the speed-condition of WCD 100 is determined to be greater than threshold speed 116.

Next, FIG. 2 illustrates a system 200 in accordance with an exemplary embodiment. As illustrated in FIG. 2, system 200 includes WCD 100, a base transceiver station (BTS) 202, a base station controller (BSC) 204, mobile switching center (MSC) 206, a local office 208, a third-party device 210, a home location register (HLR) 212, a short message service center (SMSC) 214, a text-to-speech and speech-to-text server 216, and a voice mail server 218.

The combination of certain elements of system 200, such as BTS 202, BSC 204, MSC 206, and HLR 212, may be referred to as a wireless-communications network 201. The wireless-communications network 201 may include other elements that are illustrated in FIG. 2 and/or elements that are not illustrated in FIG. 2. A wireless service provider, such as the Sprint Nextel Corporation, may operate the wireless-communications network 201 so as to provide wireless-communication service to a plurality of wireless communication devices including WCD 100.

BSC 204 may control one or more base transceiver stations including BTS 202. For clarity of FIG. 2, only BTS 202 of the one or more base transceiver stations is shown. Each of the base transceiver stations may transmit radio frequency (RF) signals from an antenna so as to form a cell and/or cell sector. When WCD 100 is located within a cell and/or cell sector, WCD 100 may receive a portion of the RF signals transmitted from a base transceiver station. WCD 100 may transmit RF signals that can be received by one or more of the base transceiver stations. The transmission of RF signals from a BTS to WCD 100 occurs in a forward-link direction, whereas transmission of RF signals from WCD 100 to a BTS occurs in a reverse-link direction.

The portion of the RF signals transmitted from BTS 202 and received by WCD 100 and the RF signals transmitted from WCD 100 to BTS 202 are identified as an air interface 220. The RF signals transmitted via air interface 220 may be arranged according to a wireless protocol such as Code Division Multiple Access (CDMA), perhaps in conformance with one or more industry specifications such as IS-95 and IS-2000. Another protocol that may be used is known as Evolution Data Optimized (EV-DO) or 1xEV-DO, perhaps in conformance with one or more industry specifications such as IS-856, Release 0 and IS-856, Revision A. Other wireless protocols may be used as well, such as Global System for Mobile Communications (GSM), Time Division Multiple Access (TDMA), and/or any others.

The RF signals transmitted from BTS 202 may be received by communication interface 104 and transmitted to processor 101 and/or data storage device 108. The RF signals transmitted from BTS 202 may include wireless communications sent on a channel known as a control channel. The wireless communications sent on a control channel may include, for example, a page message that indicates an incoming voice call is available for connecting to WCD 100, a text message, or a message-waiting-indicator. Additionally, the RF signals transmitted from BTS 202 may include wireless communications sent on a channel known as a traffic channel. The wireless communications sent on a traffic channel may include, for example, voice communications of a voice call.

Third-party device 210 may comprise a device that is operable by a third-party to initiate and/or create a communication that is directed to WCD 100. The communication may include, for example, an incoming voice call, a text message, an e-mail message, or a voice mail message. Additionally or alternatively, third-party device 210 may comprise a device that is the destination for a communication initiated and/or created by WCD 100.

In FIG. 2, a broken line is used to illustrate a wired connection (e.g., a local loop) that connects third-party device 210 to local office 208. System 200 may include this wired connection if device 210 is operable to carry out communications with local office 208 via the wired connection. Local office 208 may connect to other local offices (not shown) and to MSC 206.

MSC 206 is operable as a communications switch. MSC 206 or another device within network 201 may include a processor that executes program instructions that are similar to the program instructions 112 so that network 201 is operable to prevent or allow incoming voice calls at WCD 100, to postpone or allow presentation of messages or message-waiting-indicators at WCD 100, and to prevent or allow WCD 100 from creating or sending a wireless communication. The processor executing these program instructions may refer to an HFA profile, threshold speed, and threshold time stored at WCD 100 or within a data storage device of network 201 for execution of the program instructions.

FIG. 2 also includes a broken line polygon between third-party device 210 and BTS 202. This polygon is used to illustrate an air interface 222 between device 210 and BTS 202. System 200 may include air interface 222 if device 210 is operable to carry out wireless communications. Air interface 222 may carry the portion of the RF signals that are transmitted from BTS 202 and received by third-party device 210, and the RF signals that are transmitted from device 210 to BTS 202. The RF signals transmitted via air interface 222 may be arranged according to the same wireless protocol used for air interface 220 or another wireless protocol.

Home location register (HLR) 212 may comprise a data storage device that contains data associated with the wireless communication devices of subscribers that are authorized to use the wireless-communications network 201. With respect to WCD 100, HLR 212 may include data that indicates a location of WCD 100, data that describes a feature set of WCD 100, data for authenticating WCD is authorized to use the wireless-communications network 201, an HFA profile for WCD 100, a threshold speed for WCD 100, and a threshold time for WCD 100.

The HFA profile, threshold speed, and threshold time contained in HLR 212 for WCD 100 may be similar to the HFA profile 114, threshold speed 116, and threshold time 118 described above. HLR 212 may receive notice that the HFA profile associated with WCD 100, the threshold speed associated with WCD 100, and/or the threshold time associated with WCD 100 has changed. In response to such notice, HLR 212 may modify the HFA profile, threshold speed, and threshold time contained in HLR 212 to match the profile or threshold that changed.

Short messaging service center (SMSC) 214 comprises a device that is operable to receive short message service (SMS) messages and to forward the received SMS messages to a destination associated with each respective message (e.g., WCD 100 or device 210). The SMS messages received at SMSC 214 may be generated by any of a variety of devices. For example, an SMS message received at SMSC 214 may be generated by a WCD such as third-party device 210. As another example, an SMS message received at SMSC 214 may comprise an SMS message that is generated by server 216 performing a speech-to-text conversion of a voice mail message stored at voice mail server 218.

Text-to-speech and speech-to-text server 216 may comprise a processor that is operable to execute computer-readable program instructions for converting text to speech and/or speech to text. Execution of these program instruction may cause server 216 to convert an SMS message received from SMSC 214 to speech (e.g., an audible message), and then transmit the audible message to MSC 206 for transmission, in turn, to WCD 100. As another example, execution of the program instructions at server 216 may cause server 216 to convert a voice mail message received from voice mail server 218 to text (e.g., an SMS message), and then transmit the SMS message to SMSC 214 for transmission, in turn, to WCD 100.

Voice mail server 218 may comprise a processor, and a data storage device for storing voice mail messages that are received for a communication device, such as WCD 100. This data storage device may also contain program instructions executable by the processor of server 218 so as to cause a stored voice mail message to be transmitted to MSC 206 for transmission, in turn, to a communication device, such as WCD 100, or to server 216. Alternatively, execution of the program instructions may cause a stored voice mail message to be transmitted directly to server 216.

3. Exemplary Operation

Figure 3:
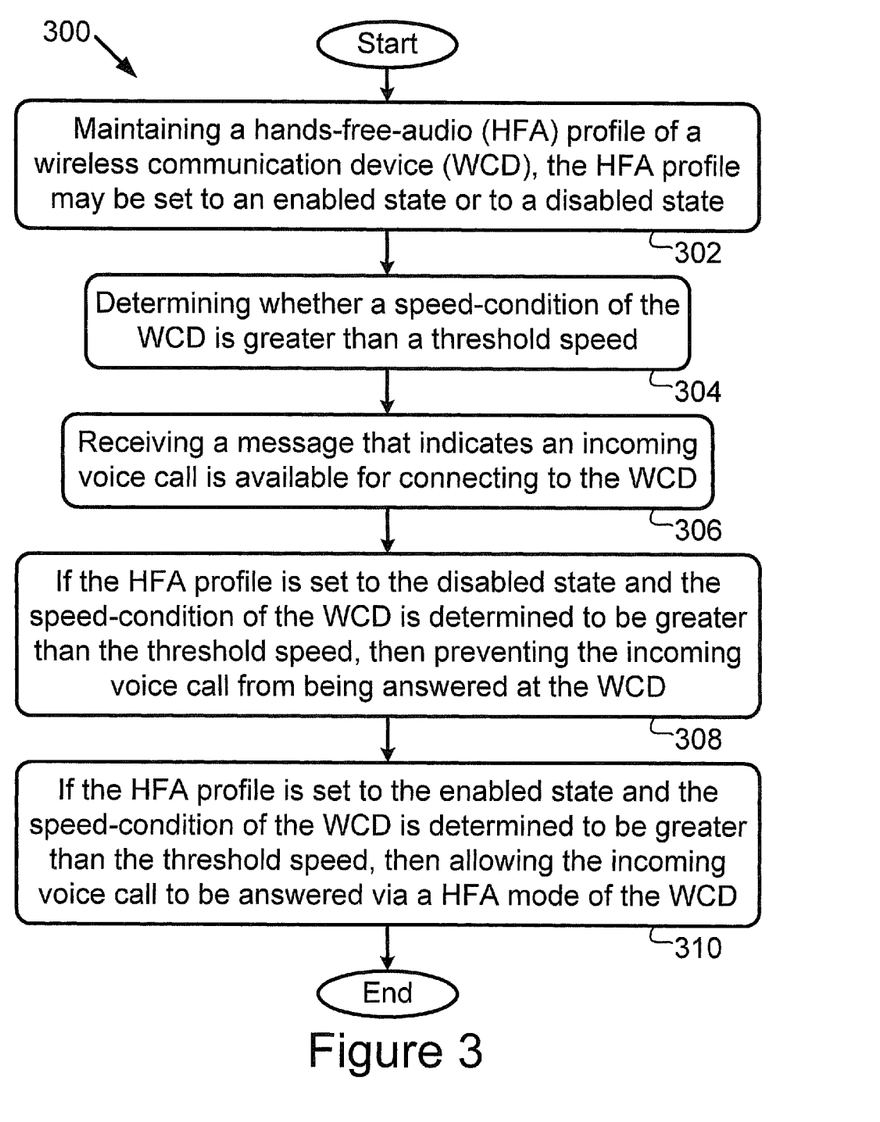
FIG. 3 is a flow chart depicting a set of functions that may be carried out in accordance with an exemplary embodiment.

Next, FIG. 3 is a flow chart provided to illustrate a set of functions 300 that may be carried out in accordance with an exemplary embodiment. The set of functions 300 may be carried out at WCD 100 or wireless-communications network 201. Alternatively, some functions of the set of functions 300 may be carried out at WCD 100 while others functions of the set of functions 300 may be carried out at wireless-communications network 201.

Block 302 includes maintaining a hands-free-audio (HFA) profile of a wireless communication device (e.g., WCD 100). The HFA profile may be set to an enabled state or a disabled state. When the HFA profile is set to the enabled state, processor 101 may be operable to execute program instructions that cause WCD 100 to operate in an HFA mode. When the HFA profile is set to the disabled state, processor 101 may be prevented from executing the program instructions that cause WCD 100 to operate in the HFA mode. When the HFA profile is set to either the enabled state or the disabled state, WCD 100 may be operable in a non-HFA mode to present and/or engage in wireless communications. Operation of WCD 100 in the non-HFA mode may be conditioned on a determination that the speed-condition of WCD 100 is less than a threshold speed (e.g., threshold speed 116).

Maintaining the HFA profile may include carrying out various functions, such as storing the HFA profile at a data storage device, and switching the HFA profile from the enabled state to the disabled state or from the disabled state to the enabled state. Any of a variety of devices may be operable to maintain the HFA profile. For example, WCD 100 may be operable to maintain the HFA profile (e.g., HFA profile 114). As another example, a device within wireless-communications network 201 (e.g., HLR 212) may be operable to maintain the HFA profile. As yet another example, multiple devices, such as WCD 100 and HLR 212, may be operable to maintain separate instances of the HFA profile. Other examples of devices that are operable to maintain the HFA profile, and other examples of functions carried out to maintain the HFA profile are also possible.

Next, block 304 includes determining whether a speed-condition of the wireless communication device (e.g., WCD 100) is greater than a threshold speed. Determining whether the speed-condition of WCD 100 is greater than a threshold speed may include a processor executing program instructions to determine a speed-condition of WCD 100, and to compare the determined speed-condition to the threshold speed. A processor that executes these program instructions may comprise processor 101, or a processor within wireless-communications network 201 (e.g., a processor within MSC 206).

Determining the speed-condition of WCD 100 may be carried out by speed detector 102 or by a device within wireless-communications network 201. In an embodiment in which processor 101 determines whether the speed-condition of WCD 100 is greater than the threshold speed, speed detector 102 may determine the speed-condition and then transmit the speed-condition to processor 101 for use in making the determination of block 304. Alternatively, the speed-condition may be determined by wireless-communications network 201 and BTS 202 may transmit the speed-condition to communication interface 104 for transmission, in turn, to processor 101. In an embodiment in which a processor within wireless-communications network 201 determines whether the speed-condition of WCD 100 is greater than the threshold speed, speed detector 102 may determine the speed-condition and communication interface 104 may transmit the speed-condition to BTS 202 for transmission in turn to the processor of network 201. Alternatively, the processor within network 201 may determine the speed-condition for use in making the determination of block 304.

In addition to or as a result of determining whether the speed-condition of the WCD is greater than the threshold speed, at block 304, the set of functions 300 may include determining that the speed-condition of the WCD 100 is less than the threshold speed, and whether the determined speed-condition is less than threshold speed 116 for at least a threshold amount of time (e.g., an amount of time indicated by threshold time 118). Thus, WCD 100 or network 201 may base its determination that WCD 100 is not in a moving vehicle on the speed-condition of WCD 100 being less than threshold speed 116 for a least the threshold amount of time. In this way, WCD 100 or network 201 may require that WCD 100 has a speed-condition less that threshold speed 116 for at least the threshold amount of time before WCD 100 or network 201 allows WCD 100 to carry out wireless communications in a non-HFA mode.

Next, block 306 includes receiving a message that indicates an incoming voice call is available for connecting to the wireless communication device (e.g., WCD 100). For purposes of this description, this message is referred to as the incoming voice call message. In one respect, the receiving function of block 306 may be carried out by WCD 100. In this regard, the incoming voice call message may comprise a page message sent to WCD 100 via air interface 220. In another respect, the receiving function of block 306 may be carried out by a device of wireless-communications network 201. As an example, the device of network 201 (e.g., MSC 206) may receive the incoming voice call message from local office 208 when third-party device 210, arranged as a land-line telephone, places a call to WCD 100. As another example, MSC 206 may receive the incoming voice call message from BSC 204 in response to third-party device 210, arranged as a WCD, transmitting to BTS 202 a request to initiate the voice call. Other examples of devices that receive the incoming voice call message are also possible.

The function of receiving the incoming voice call message may occur after carrying out the function of determining whether the speed-condition of the WCD is greater than the threshold speed. Alternatively, the function of receiving the incoming voice call message may occur prior to carrying out the function of determining whether the speed-condition of the WCD is greater than the threshold speed.

Next, block 308 includes, if the HFA profile (e.g., HFA profile 114) is set to the disabled state and the speed-condition of the wireless communication device (e.g., WCD 100) is determined to be greater than the threshold speed (e.g., threshold speed 116), then preventing the incoming voice call from being answered at the WCD.

In one respect, preventing the incoming voice call from being answered at the WCD may be carried out by WCD 100. As an example, processor 101 may receive from communication interface 104 the incoming voice call message and then execute program instructions that prevent the incoming voice call from being answered. Execution of these program instructions may (i) prevent user interface 106 from presenting an alert (e.g., a ringtone) that indicates the incoming voice call is available for answering, and/or (ii) cause communication interface 104 to send via air interface 220 a message that causes the incoming voice call to be switched to voice mail server 218 so that the caller can record a voice mail message for a user of WCD 100.

In another respect, preventing the incoming voice call from being answered at the WCD may be carried out by wireless-communications network 201. In this regard, wireless-communications network 201 may switch the incoming voice call to voice mail server 218 so that the caller can record a voice mail message for a user of WCD 100. In preventing the incoming voice call from being answered at the WCD, wireless-communications network 201 may not send the incoming voice call message to the WCD.

Next, block 310 includes, if the HFA profile (e.g., HFA profile 114) is set to the enabled state and the speed-condition of the wireless communication device (e.g., WCD 100) is determined to be greater than the threshold speed (e.g., threshold speed 116), then allowing the incoming voice call to be answered via an HFA mode of the wireless communication device.

In one respect, allowing the incoming voice call to be answered via an HFA mode of the WCD may be carried out by WCD 100. As an example, processor 101 may execute program instructions to notify a user that the voice call is available for connecting to WCD 100. Execution of such program instruction may cause user interface 106 to present an alert (e.g., a ringtone or a vibration) to notify the user that the voice call is available. Additionally or alternatively, execution of the program instruction may cause communication interface 104 to transmit a signal to the HFA device so as to notify the HFA device that the incoming voice call is available for answering via the HFA device. A user of WCD 100 may use the HFA device to answer the incoming voice call at his or her discretion.

In another respect, allowing the incoming voice call to be answered via an HFA mode of the WCD may be carried out by wireless-communications network 201. In this regard, BTS 202 may transmit via air interface 220 a page message that indicates the incoming voice call is available for connecting to WCD 100 so that WCD 100 can present an alert (e.g., a ringtone) that indicates the voice call is available for answering. A user of WCD 100 may use the HFA device to answer the incoming voice call at his or her discretion.

Other functions may be carried out while the HFA profile is set to the disabled state and the speed-condition of WCD 100 is determined to be greater than the threshold speed. As an example, processor 101 may execute program instructions that prevent WCD 100 from (i) initiating a voice call, (ii) creating a message such as an SMS message, an MMS message, or an e-mail message, (iii) sending a message such as an SMS message, an MMS message, or an e-mail message, and/or (iv) presenting a message such as an SMS message, an MMS message, or an e-mail message.

Other functions may be carried out while the HFA profile is set to the enabled state and the speed-condition of WCD 100 is determined to be greater than the threshold speed. As an example, processor 101 may execute program instructions that allow WCD 100 to operate in the HFA mode and to initiate an outgoing voice call or some other wireless communication via the HFA mode.

If the speed-condition of the WCD is determined to be less than the threshold speed and the HFA profile is set to the disabled state, then the set of functions 300 may further include allowing the incoming voice call to be answered via a non-HFA mode of the WCD. Furthermore, if the speed-condition of the WCD is determined to be less than the threshold speed and the HFA profile is set to the enabled state, then the set of functions 300 may include allowing the incoming voice call to be answered via the HFA mode of the WCD or via the non-HFA mode of the WCD.

Figure 4:
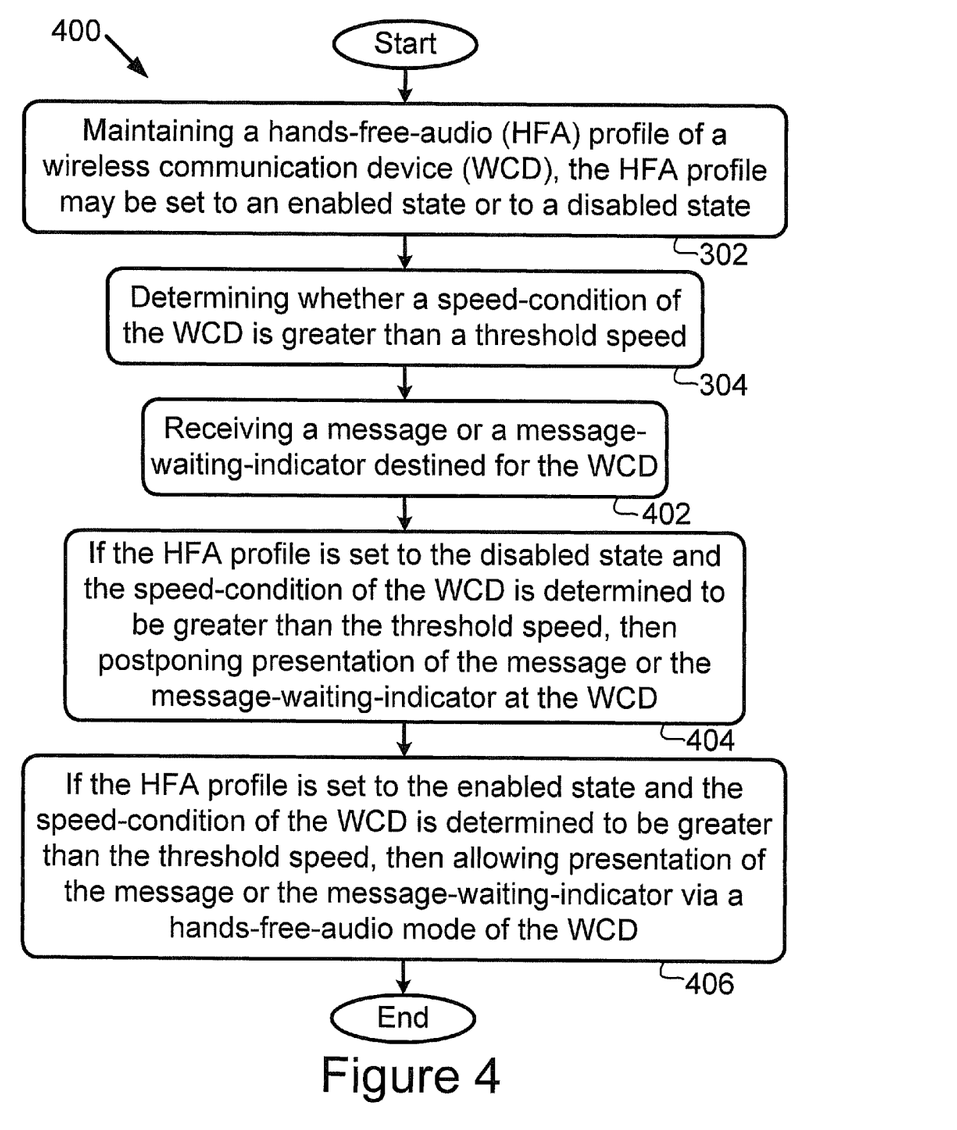
FIG. 4 is a flow chart depicting another set of functions that may be carried out in accordance with an exemplary embodiment.

Next, FIG. 4 is a flow chart provided to illustrate a set of functions 400 that may be carried out in accordance with an exemplary embodiment. The set of functions 400 may be carried out at WCD 100 or wireless-communications network 201. Alternatively, some functions of the set of functions 400 may be carried out at WCD 100 while others function of the set of functions 400 may be carried out at wireless-communications network 201.

Block 302 includes maintaining an HFA profile of a wireless communication device (WCD). The HFA profile may be set to an enabled state or to a disabled state. The functionality of block 302 of the set of functions 400 is the same as the functionality of block 302 of the set of functions 300, as described above.

Next, block 304 includes determining whether a speed-condition of the WCD is greater than a threshold speed. The functionality of block 304 of the set of functions 400 is the same as the functionality of block 304 of the set of functions 300, as described above.

Next, block 402 includes receiving a message or a message-waiting-indicator destined for the WCD (e.g., WCD 100). The message destined for the WCD may comprise, for example, a text message, an SMS message, a multimedia messaging service (MMS) message, an enhanced message service (EMS) message, or another type of message. The message-waiting-indicator destined for the WCD may comprise, for example, data that indicates a voice mail message is available for sending to the WCD, data that indicates a facsimile is available for sending to the WCD, data that indicates the WCD missed a voice call that was placed to the WCD, or some other data. The message-waiting-indicator may comprise a text message.

In one respect, the receiving function of block 402 may be carried out at WCD 100. Wireless-communications network 201 may transmit the message or message-waiting-indicator via air interface 220 and communication interface 104 of WCD 100 may receive the transmitted message or message-waiting-indicator. After receiving the message or message-waiting-indicator, communication interface 104 may provide the received message or message-waiting-indicator to processor 101 and/or data storage 108.

In another respect, the receiving function of block 402 may be carried out at wireless-communications network 201. As an example, wireless-communications network 201 may receive an SMS message from SMSC 214 or a message-waiting-indicator from voice mail server 218. As another example, wireless-communications network 201 may receive a message, such as a voice mail message or SMS message, from third-party device 210 or local office 208. Other examples of wireless-communications network 201 receiving the message or message-waiting-indicator are also possible.

Next, block 404 includes, if the HFA profile is set to the disabled state and the speed-condition of the wireless communication device (e.g., WCD 100) is determined to be greater than the threshold speed, then postponing presentation of the message or the message-waiting-indicator at the wireless communication device. In one respect, postponing presentation of the message or the message-waiting indicator may be carried out at WCD 100. In this regard, processor 101 may execute program instructions that cause the message or message-waiting-indicator to be stored at data storage device 108, and the processor 101 to monitor the state of HFA profile 114 and whether the speed-condition of WCD goes below threshold speed 116. In another respect, postponing presentation of the message or message-waiting-indicator may be carried out via wireless-communications network 201. In this regard, MSC 206 or another device within network 201 may prevent the message or message waiting indicator from being transmitted to WCD 100 such that the WCD is prevented form presenting the message.

Next, block 406 includes, if the HFA profile is set to the enabled state and the speed-condition of the wireless communication device (e.g., WCD 100) is determined to be greater than the threshold speed (e.g., threshold speed 116), then allowing presentation of the message or the message-waiting-indicator via an HFA mode of the wireless communication device. In one respect, allowing presentation of the message or message-waiting-indicator may be carried out via WCD 100. WCD 100 may allow presentation of the message or message-waiting-indicator via an HFA mode of WCD 100. Presentation of the message or message-waiting-indicator via the HFA mode may include presenting the message or message-waiting-indicator via the HFA device.

In another respect, allowing presentation of the message or message-waiting-indicator may be carried out via wireless-communications network 201. In this regard, network 201 may allow presentation of the message or message-waiting-indicator by transmitting the message or message-waiting-indicator to WCD 100. WCD 100 may receive the transmitted message or message-waiting-indicator and thereafter present the message or message-waiting-indicator via the HFA mode of WCD 100.

Other functions may be carried out in combination with the set of functions 400. For example, after postponing presentation of the message or the message-waiting-indicator at block 404, WCD 100 may determine that the speed-condition of WCD 100 is less than threshold speed 116 and that HFA profile 114 is set to disabled. In response to making these determinations, WCD 100 may allow presentation of the message or message-waiting-indicator via a non-HFA mode of WCD 100. Presentation of the message or message-waiting-indicator via the non-HFA mode may include presenting the message or message-waiting-indicator via user interface 106.

As another example, after postponing presentation of the message or the message-waiting-indicator at block 404, wireless-communications network 201 may determine that (i) the speed-condition of WCD 100 is less than a threshold speed that is associated with WCD 100 and stored at network 201, and (ii) an HFA profile associated with WCD 100 and stored at network 201 is set to the disabled state. In response to making these determinations, wireless-communications network 201 may allow presentation of the message or message-waiting-indicator by transmitting the message or message-waiting-indicator to WCD 100. WCD 100 may receive the transmitted message or message-waiting-indicator and thereafter present the message or message-waiting-indicator via a non-HFA mode of WCD 100.

As another example, after postponing presentation of the message or the message-waiting-indicator at block 404, WCD 100 may determine that the speed-condition of WCD 100 is less than threshold speed 116 and that HFA profile 114 is set to enabled. In response to making these determinations, WCD 100 may allow presentation of the message or message-waiting-indicator via a non-HFA mode or an HFA mode of WCD 100. Presentation of the message or message-waiting-indicator via the non-HFA mode may include presenting the message or message-waiting-indicator via user interface 106. Presentation of the message or message-waiting-indicator via the HFA mode may include presenting the message or message-waiting-indicator via the HFA device.

As another example, after postponing presentation of the message or the message-waiting-indicator at block 404, wireless-communications network 201 may determine that (i) the speed-condition of WCD 100 is less than a threshold speed that is associated with WCD 100 and stored at network 201, and (ii) an HFA profile associated with WCD 100 and stored at network 201 is set to the enabled state. In response to making these determinations, wireless-communications network 201 may allow presentation of the message or message-waiting-indicator by transmitting the message or message-waiting-indicator to WCD 100. WCD 100 may receive the transmitted message or message-waiting-indicator and thereafter present the message or message-waiting-indicator via a non-HFA mode of WCD 100 or via an HFA mode of WCD 100.

As another example, after postponing presentation of the message or the message-waiting-indicator at block 404, WCD 100 may determine that HFA profile 114 is set to the enabled state, and that the speed-condition of WCD 100 is greater than threshold speed 116. In response to making these determinations, WCD 100 may allow presentation of the message or message-waiting-indicator via an HFA mode of WCD 100. Presentation of the message or message-waiting-indicator via the HFA mode may include presenting the message or message-waiting-indicator via the HFA device.

As another example, after postponing presentation of the message or the message-waiting-indicator at block 404, wireless-communications network 201 may determine that (i) the HFA profile that is associated with WCD 100 and stored at network 201 is set to the enabled state, and (ii) the speed-condition of WCD 100 is greater than a threshold speed that is associated with WCD 100 and stored at network 201. In response to making these determinations, wireless-communications network 201 may allow presentation of the message or message-waiting-indicator by transmitting the message or message-waiting-indicator to WCD 100. WCD 100 may receive the transmitted message or message-waiting-indicator and thereafter present the message or message-waiting-indicator via an HFA mode of WCD 100.

4. Emergency Versus Non-Emergency Operation

While the exemplary methods and systems described above provide for preventing or postponing wireless communications, these methods and systems may be configured such that only non-emergency communications are prevented or postponed, whereas emergency communications are allowed to be sent from or received by WCD 100 (i.e., not prevented or postponed). For example, WCD 100 may be programmed with one or more emergency communication destinations (e.g., phone numbers, e-mail addresses or other destination).

In the United States, a popular emergency phone number is 911. In this regard, if WCD 100 is being used in the United States, WCD 100 may be used to place an outgoing call to the phone number 911 regardless of a state of an HFA profile associated with WCD 100 and regardless of a speed-condition of WCD 100. In this way, if WCD 100 is being used in a vehicle operating at a speed greater than threshold speed 116 and the HFA profile 114 is set to the disabled state, WCD 100 can be used to carry out an emergency communication such as a voice call to the phone number 911 or an emergency text message to an emergency phone number, but can be prevented from carrying out a non-emergency communication (e.g., a voice call to a non-emergency phone number).

Additionally, WCD 100 can be configured such that when a voice call (emergency or non-emergency) is initiated from third party device 210 (or another calling device) to WCD 100, communications network 201 may initially postpone the voice call from being presented to WCD 100. While the call is postponed, network 201 may provide a signal and/or message that notifies a caller using device 210 that he or she can use device 210 to override postponement of the call. For example, network 201 may provide device 210 with a message that states, "The called party is in a moving vehicle. Press 1 to leave a voice message for the called party or press 2 to connect your call to the called party." If the caller presses a number 2 key on device 210, device 210 can notify network 201 that the number 2 key was pressed and network 201 can responsively present the caller's voice call to WCD 100. A person having ordinary skill in the art will understand that other messages could be provided to device 210 to notify the user of how to override call postponement, and this person will also understand that other keys on device 210 could be used to override call postponement.

5. Conclusion

Exemplary embodiments of the present invention have been described above. Those skilled in the art will understand that changes and modifications may be made to the described embodiments without departing from the true scope and spirit of the present invention, which is defined by the claims.

We claim:

1. A method comprising:
   storing, at a non-transitory computer-readable data storage device of a wireless communication device, a hands-free-audio profile of the wireless communication device, computer-readable data that indicates a threshold speed, and computer-readable data that indicates a threshold time, wherein the hands-free-audio profile can be switched from an enabled state to a disabled stated and from the disabled stated to the enabled state;
   determining, using a processor of the wireless communication device, a most-recent speed-condition of the wireless communication device, wherein the most-recent speed-condition indicates whether the wireless communication device is moving at a speed greater than the threshold speed and indicates an amount of consecutive time that the wireless communication device has been stationary or moving at a speed less than the threshold speed;
   monitoring, at the processor of the wireless communication device, a state of the hands-free-audio profile;
   receiving, at the wireless communication device, a message that indicates an incoming voice call is available for connecting to the wireless communication device;
   if the hands-free-audio profile monitored by the processor is set to the disabled state and the amount of consecutive time is less than the threshold amount of time, then executing, using the processor, computer-readable program instructions to prevent the incoming voice call from being answered at the wireless communication device; and
   if the hands-free-audio profile monitored by the processor is set to the enabled state and the amount of consecutive time is less than the threshold amount of time, then, executing, using the processor, computer-readable program instructions that prevent the incoming voice call from being answered in a non-hands-free-audio mode of the wireless communication device and to answer the incoming voice call using a hands-free-audio mode of the wireless communication device.

2. The method of claim 1,
   wherein receiving the message comprises the wireless communication device receiving a wireless page message that indicates the incoming voice call is available for connecting to the wireless communication device.

3. The method of claim 1,
   wherein, if the hands-free-audio profile monitored by the processor is set to the disabled state and the most-recent speed condition alternatively indicates that the wireless communication device has been moving at a speed less than the threshold speed for an amount of time greater than or equal to the threshold time, then, executing, using the processor, computer-readable program instructions that allow the incoming voice call to be answered via a non-hands-free-audio mode of the wireless communication device,
   wherein, if the hands-free-audio profile monitored by the processor is set to the enabled state and the most-recent speed condition alternatively indicates that the wireless communication device has been moving at a speed less than the threshold speed for an amount of time greater than or equal to the threshold time, then, executing, using the processor, computer-readable program instructions that allow the incoming voice call to be answered using the hands-free-audio mode of the wireless communication device or the non-hands-free-audio mode of the wireless communication device, wherein, if the hands-free-audio profile monitored by the processor is set to the disabled state and the most-recent speed-condition determined by the processor indicates the wireless communication device is moving at a speed greater than the threshold speed, then executing, using the processor, computer-readable program instructions to prevent the incoming voice call from being answered at the wireless communication device, and wherein, if the hands-free-audio profile monitored by the processor is set to the enabled state and the most-recent speed-condition determined by the processor indicates the wireless communication device is moving at a speed greater than the threshold speed or the amount of consecutive time is less than the threshold amount of time, then, executing, using the processor, computer-readable program instructions that prevent the incoming voice call from being answered in a non-hands-free-audio mode of the wireless communication device and to answer the incoming voice call using a hands-free-audio mode of the wireless communication device.

4. The method of claim 1, wherein determining the most-recent speed-condition of the wireless communication device occurs prior to receiving the message that indicates the incoming voice call is available for connecting to the wireless communication device.

5. The method of claim 1, wherein determining the most-recent speed-condition of the wireless communication device occurs after receiving the message that indicates the incoming voice call is available for connecting to the wireless communication device.

6. The method of claim 1, further comprising:
executing, using the processor, computer-readable program instructions that prevent the wireless communication device from initiating a voice call if the hands-free-audio profile is set to the disabled state and the most-recent speed-condition indicates that the wireless communication device is moving at a speed greater than the threshold speed; and
executing, using the processor, computer-readable program instructions that allow the wireless communication device to initiate an outgoing voice call using the hands-free audio mode if the hands-free-audio profile is set to the enabled state and the most-recent speed-condition indicates that the wireless communication device is moving at a speed greater than the threshold speed.

7. A method comprising:
storing, at a non-transitory computer-readable data storage device of a wireless communication device, a hands-free-audio profile of the wireless communication device, computer-readable data that indicates a threshold speed, and computer-readable data that indicates a threshold time, wherein the hands-free-audio profile can be switched from an enabled state to a disabled stated and from the disabled stated to the enabled state;
determining, using a processor of the wireless communication device, a most-recent speed-condition of the wireless communication device, wherein the most-recent speed-condition indicates whether the wireless communication device is moving at a speed greater than the threshold speed and indicates an amount of consecutive time that the wireless communication device has been stationary or moving at a speed less than the threshold speed;
monitoring, at the processor of the wireless communication device, a state of the hands-free-audio profile;
receiving, at the wireless communication device, a message destined for the wireless communication device;
if the hands-free-audio profile monitored by the processor is set to the disabled state and the amount of consecutive time is less than the threshold amount of time, then postponing presentation of the message at the wireless communication device; and
if the hands-free-audio profile monitored by the processor is set to the enabled state and the most-recent speed-condition determined by the processor indicates the wireless communication device is moving at a speed greater than the threshold speed, then allowing presentation of the message using a hands-free-audio mode of the wireless communication device.

8. The method of claim 7, wherein the message is selected from the group consisting of a text message, a short message service (SMS) message, a multimedia messaging service (MMS) message, an enhanced message service (EMS) message, and a text message comprising a message-waiting indicator.

9. The method of claim 8, wherein the message-waiting-indicator comprises data that indicates that a voice mail message or a facsimile is available for sending to the wireless communication device or that the wireless communication device missed a voice call that was placed to the wireless communication device.

10. The method of claim 7, further comprising:
after postponing presentation of the message, determining, using the processor, a subsequent most-recent speed-condition of the wireless communication devices;
if the hands-free-audio profile is set to the disabled state and the subsequent most-recent speed-condition indicates an amount of consecutive time, greater than or equal to the threshold time, that the wireless communication device has been moving at a speed less than the threshold speed, then allowing presentation of the message using a non-hands-free-audio mode of the wireless communication device, and
if the hands-free-audio profile is set to the enabled state and the subsequent most-recent speed-condition indicates an amount of consecutive time, greater than or equal to the threshold time, that the wireless communication device has been moving at a speed less than the threshold speed, then allowing presentation of the message using the hands-free-audio mode of the wireless communication device or the non-hands-free-audio mode of the wireless communication device.

11. The method of claim 7,
if the hands-free-audio profile is set to the enabled state and the amount of consecutive time is less than the threshold amount of time, then allowing presentation of the message using the hands-free-audio mode of the wireless communication device but not via a non-hands-free-audio mode of the wireless communication device, and
if the hands-free-audio profile monitored by the processor is set to the disabled state and the most-recent speed-condition determined by the processor indicates the wireless communication device is moving at a speed greater than the threshold speed, then postponing presentation of the message at the wireless communication device.

12. The method of claim 7, further comprising:
if the hands-free-audio profile monitored by the processor is set to the disabled state and if the amount of consecutive time is greater than or equal to the threshold amount of time, then allowing presentation of the message using a non-hands-free-audio mode of the wireless communication device, and if the hands-free-audio profile monitored by the processor is set to the enabled state and if the amount of consecutive time is greater than or equal to the threshold amount of time, then allowing presentation of the message using the hands-free-audio mode of the wireless communication device or via the non-hands-free-audio mode of the wireless communication device.

13. A wireless communication device comprising:

a computer-readable data storage device storing computer-readable program instructions, a hands-free-audio profile, data that indicates a threshold speed, and data that indicates a threshold time, wherein the hands-free-audio profile can be switched from an enabled state to a disabled state and from the disabled state to the enabled state;

a processor that executes the computer-readable program instructions; and a communication interface configured to receive a message that indicates an incoming voice call is available for connecting to the wireless communication device, wherein the program instructions comprise first program instructions that are executable by the processor to determine a most-recent speed-condition of the wireless communication device, wherein the most-recent speed-condition indicates whether the wireless communication device is moving at a speed greater than the threshold speed and indicates an amount of consecutive time that the wireless communication device has been stationary or moving at a speed less than the threshold speed, wherein the program instructions comprise second program instructions that are executable by the processor to prevent the incoming voice call from being answered by the wireless communication device, wherein the processor executes the second program instructions in response to (i) the communication interface receiving the message and (ii) a determination that the hands-free-audio profile is set to the disabled state and the amount of consecutive time is less than the threshold amount of time, and wherein the program instructions comprise third program instructions that are executable by the processor to answer the incoming voice call using a hands-free audio mode of the wireless communication device, wherein the processor executes the third program instructions in response to (i) the communication interface receiving the message and (ii) a determination that the hands-free-audio profile is set to the enabled state and or the amount of consecutive time is less than the threshold amount of time.

14. The system of claim 13, wherein the program instructions comprise fourth program instructions that are executable if the hands-free-audio profile is set to the disabled state and the amount of consecutive time is greater than or equal to the threshold amount of time, wherein execution of the fourth program instructions allows the incoming voice call to be answered via a non-hands-free-audio mode of the wireless communication device but not via the hands-free-audio mode of the wireless communication device, wherein the program instructions comprise fifth program instructions that are executable if the hands-free-audio profile is set to the enabled state and the amount of consecutive time is greater than or equal to the threshold amount of time, and wherein execution of the fifth program instructions allows the incoming voice call to be answered via the hands-free-audio mode of the wireless communication device or the non-hands-free-audio mode of the wireless communication device.

15. A wireless communication device comprising:

a computer-readable data storage device storing computer-readable program instructions, a hands-free-audio profile, data that indicates a threshold speed, and data that indicates a threshold time, wherein the hands-free-audio profile can be switched from an enabled state to a disabled state and from the disabled state to the enabled state;

a processor that executes the computer-readable program instructions; and a communication interface configured to receive a message that is destined for the wireless communication device, wherein the program instructions comprise first program instructions that are executable by the processor to determine a most-recent speed-condition of the wireless communication device, wherein the most-recent speed-condition indicates whether the wireless communication device is moving at a speed greater than the threshold speed and indicates an amount of consecutive time that the wireless communication device has been stationary or moving at a speed less than the threshold speed, wherein the program instructions comprise second program instructions that are executable by the processor to cause presentation of the received message to be postponed, wherein the processor executes the second program instructions in response to (i) the communication interface receiving the message and (ii) a determination that the hands-free-audio profile is set to the disabled state and the amount of consecutive time is less than the threshold amount of time, and wherein the program instructions comprise third program instructions that are executable by the processor to cause the received message to be presented using a hands-free audio mode of the wireless communication device, wherein the processor executes the third program instructions in response to (i) the communication interface receiving the message and (ii) a determination that the hands-free-audio profile is set to the enabled state and the amount of consecutive time is less than the threshold amount of time.

16. The system of claim 15, wherein the message comprises a text message, wherein the execution of the third program instructions converts the text message to an audible message, and wherein execution of the third program instructions causes the communication interface to transmit the audible message to a hands-free-audio device associated with the wireless communication device so as to allow presentation of the audible message via the hands-free-audio device.

17. The method of claim 1, wherein the wireless communication device prevents the incoming voice call from being answered at the wireless communication device by preventing a user interface of the wireless communication device from presenting an alert that indicates the incoming voice call is available for answering, and the wireless communication device sending via an air interface a message that causes the incoming voice call to be switched to a voice mail server so that a caller can record a voice mail message for a user of the wireless communication device.

18. The method of claim 1, wherein the threshold speed depends upon an age of a person that uses the wireless communication device.

19. The method of claim 18, wherein the threshold speed for an age less than a given age is less than the threshold speed for an age greater than the given age.

20. The method of claim 1, wherein the threshold speed is 0 kilometers per hour.

21. The system of claim 13,
wherein the processor also executes the second program instructions in response to (i) the communication interface receiving the message and (ii) a determination that the hands-free-audio profile is set to the disabled state and the most-recent speed-condition indicates that the wireless communication device is moving at a speed greater than the threshold speed, and
wherein the processor executes the third program instructions in response to (i) the communication interface receiving the message and (ii) a determination that the hands-free-audio profile is set to the enabled state and the most-recent speed-condition indicates that the wireless communication device is moving at a speed greater than the threshold speed.

22. The wireless communication device of claim 15,
wherein the processor also executes the second program instructions in response to (i) the communication interface receiving the message and (ii) a determination that the hands-free-audio profile is set to the disabled state and the most-recent speed-condition indicates that the wireless communication device is moving at a speed greater than the threshold speed, and
wherein the processor also executes the third program instructions in response to (i) the communication interface receiving the message and (ii) a determination that the hands-free-audio profile is set to the enabled state and the most-recent speed-condition indicates that the wireless communication device is moving at a speed greater than the threshold speed.

\* \* \* \* \*